United States Patent [19]

Moreau

[11] 4,043,459
[45] Aug. 23, 1977

[54] APPARATUS FOR LOADING STILLAGES

[75] Inventor: Alain Moreau, Morancez, France

[73] Assignee: Alcan Research and Development Limited, Montreal, Canada

[21] Appl. No.: 719,084

[22] Filed: Aug. 31, 1976

[30] Foreign Application Priority Data

Sept. 3, 1975 United Kingdom ............... 36346/75

[51] Int. Cl.² ............................................. B65G 57/18
[52] U.S. Cl. ............................... 214/6 DK; 214/6 G; 214/6 M
[58] Field of Search ................. 214/1 P, 6 DK, 6 M, 214/6 N, 6 F, 6 G, 6 FS, 6 DS, 6 P

[56] References Cited

U.S. PATENT DOCUMENTS

| 3,338,376 | 8/1967 | Cross | 214/6 G X |
| 3,861,536 | 1/1975 | Braner et al. | 214/6 G |
| 3,880,296 | 4/1975 | Kaplan | 214/6 DK |

FOREIGN PATENT DOCUMENTS

| 1,186,408 | 1/1965 | Germany | 214/6 FS |
| 969,527 | 9/1964 | United Kingdom | 214/6 DK |

Primary Examiner—L. J. Paperner
Attorney, Agent, or Firm—Cooper, Dunham, Clark, Griffin & Moran

[57] ABSTRACT

The specification describes an apparatus for loading a stillage, for example with elongate articles such as extrusions. The apparatus comprises a horizontal series of spaced forwardly projecting sub-frames each carrying one or more rollers rotatable about a horizontal forwardly extending axis on to which rollers the extrusions can be fed from one side. The sub-frames can be moved forward and rearward relative to the frame of the apparatus. Between adjacent sub-frames are tines which can be raised to lift the extrusions off the rollers and, after the sub-frames and rollers have been moved rearwardly, can be lowered to lower the extrusions on to the stillage. The tines can then be moved rearward to disengage them from the extrusions on the stillage, either by movement of the tines relative to the main frame or by moving the main frame itself. Means is provided for depositing spacers on the extrusions while they are in their raised position after having been lifted from the rollers by the tines.

10 Claims, 6 Drawing Figures

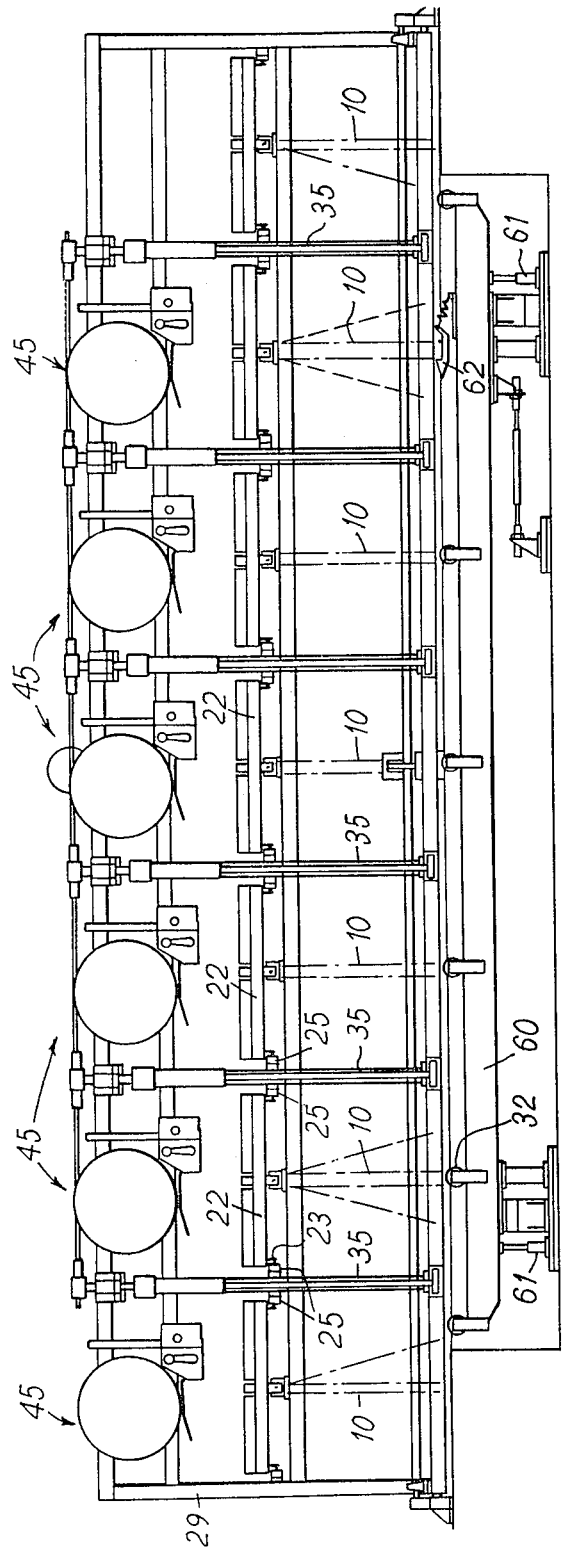

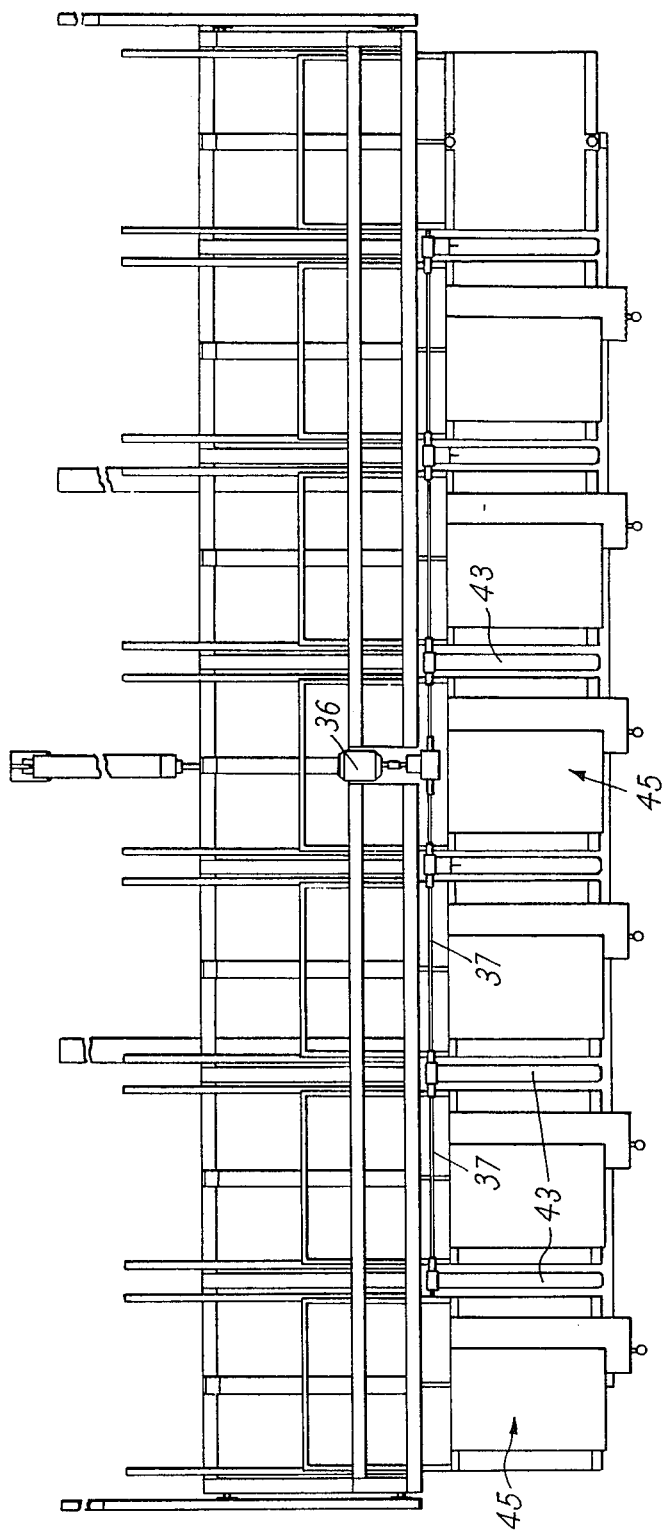

APPARATUS FOR LOADING STILLAGES

This invention relates to apparatus for loading stillages and has a particularly useful but not exclusive application in loading elongate extrusions on to stillages.

According to this invention there is provided apparatus for loading a stillage, comprising a main frame, a plurality of forwardly projecting sub-frames which are mounted horizontally in line with each other on the main frame for forward and rearward movement relative to the main frame and which are spaced apart, each sub-frame carrying one or more horizontal rollers mounted for rotation about respective horizontal axes extending at right angles to the direction in which the sub-frames are spaced apart, a plurality of forwardly projecting tines interspersed with the sub-frames in said direction so as to be capable of being moved vertically to levels above and below the subframes, the tines being mounted for vertical movement in unison relative to the frame to levels above and below the sub-frames and being movable forwardly and rearwardly.

In one arrangement, the frame is fixed against forward and rearward movement and means is provided which operates to move the tines forward and rearward relative to the frame. In an alternative arrangement the tines are fixed against forward and rearward movement relative to the frame and are moved forward and rearward by moving the frame forward and rearward.

Preferably the tines are mounted for limited pivotal vertical movement relative to the means whereby the tines are moved vertically between said levels and wherein sensing means is provided which is adapted to actuate movement of the tines rearward when the tines are moved upward through a predetermined distance in said limited vertical movement.

One embodiment of the invention will now be described by way of example with reference to the accompanying diagrammatic drawings in which:

FIG. 5 is a general side elevation of the apparatus but incorporates a modification, and FIG. 6 is a plan view of the apparatus.

Figure 1:
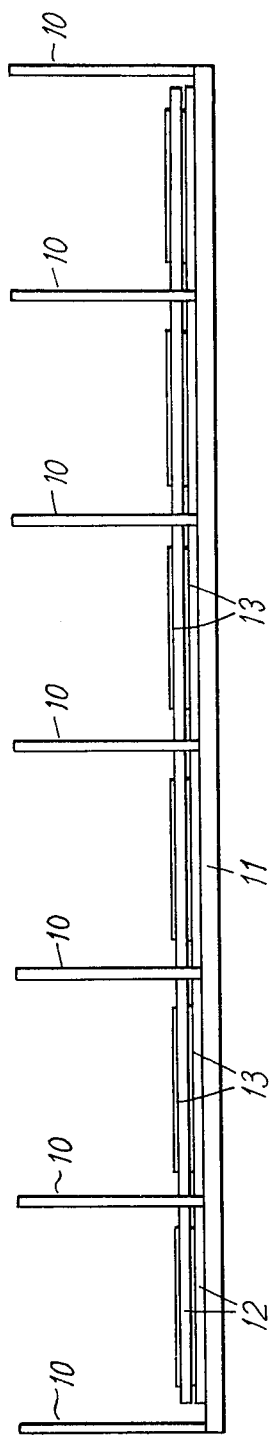
FIG. 1 is a side view of a partly-loaded stillage.
Figure 2:
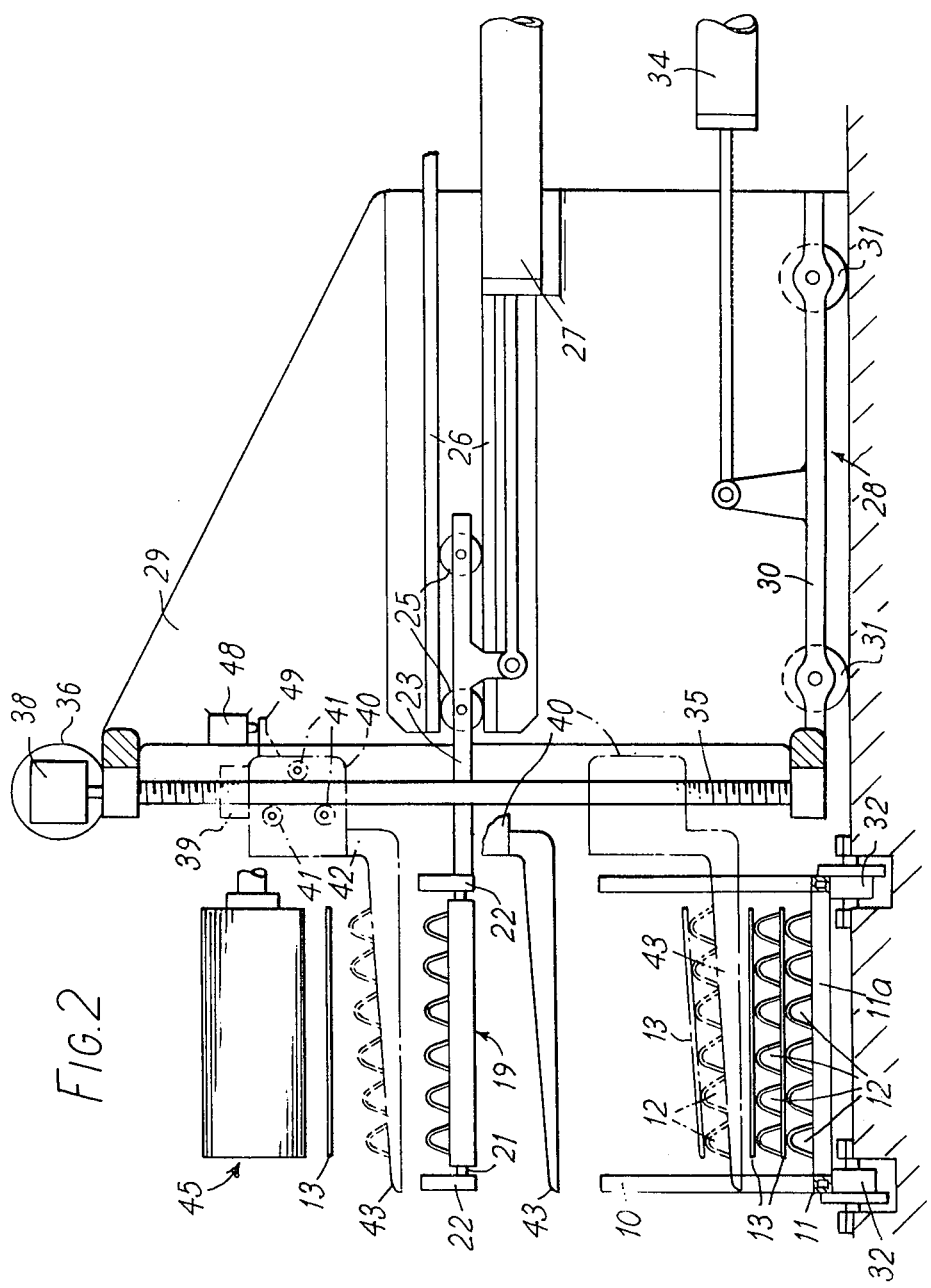
FIG. 2 is a side elevation of an apparatus according to the invention for loading the stillage of FIG. 1.

Referring first to FIGS. 1 and 5, the illustrated stillage comprises two spaced parallel lines of upright posts 10, the posts in each line being secured by their lower ends to a longitudinal member 11. The two longitudinal members are spaced apart by and secured to transverse members 11a (FIG. 2) so that the space between the two lines of posts is unobstructed. The stillage is intended to receive several similar cut lengths of extruded metal disposed side by side and forming a layer. Two such layers of extruded lengths 12 are shown on the stillage in FIG. 1, spacers 13 being disposed on top of each layer of extruded lengths.

Figure 3:
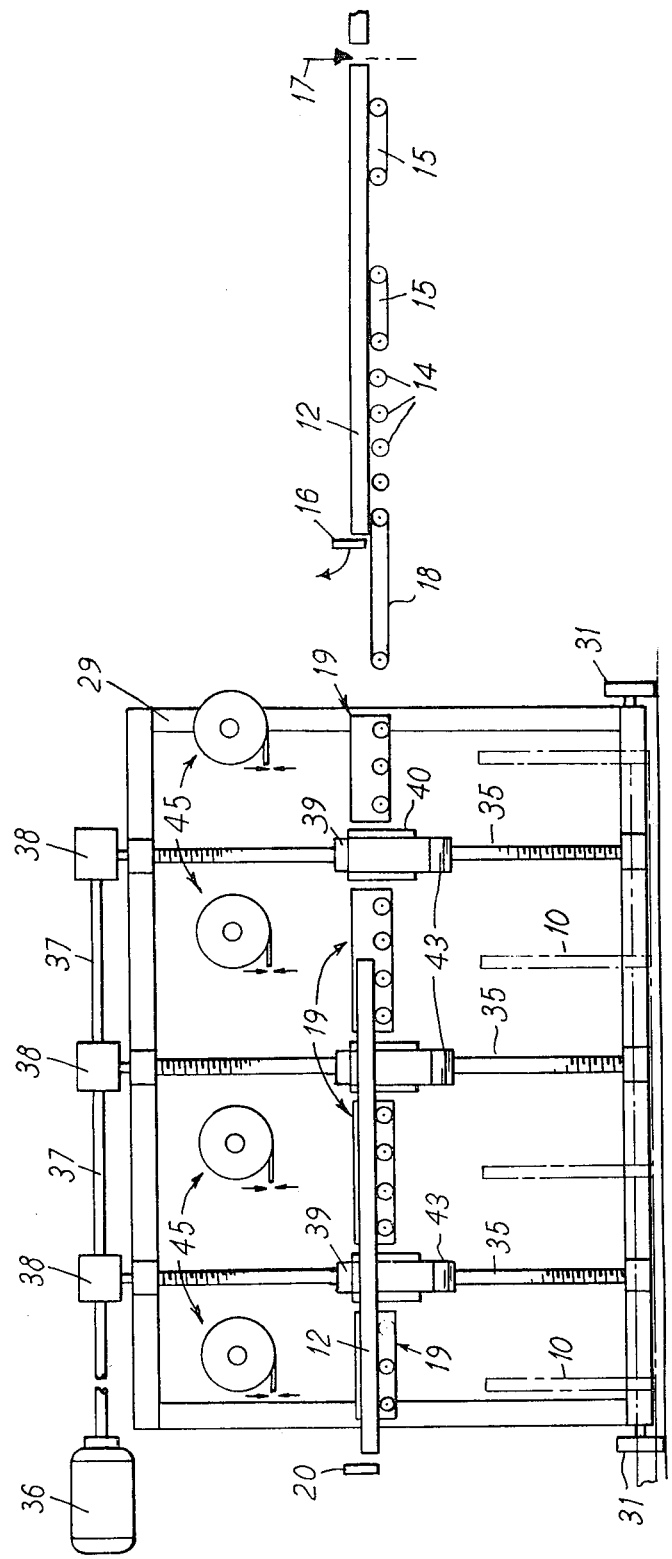
FIG. 3 is a side view corresponding to FIG. 1 showing the apparatus in position against the stillage.

Referring now to FIG. 3 lengths of metal are supported and conveyed from a set of extrusion nozzles by rollers 14 and endless belts 15. The leading ends of the extruded lengths come against a stop 16 and a saw 17 then cuts through the extruded lengths. The stop 16 is then moved into an inoperative position and the cut lengths are moved on by endless belts 15 and 18 and are supported first by rollers 14 and then by sets of rollers 19. When the cut lengths come into position over the stillage, their leading ends abut against a stop 20.

The rollers 19 of each set are mounted (see FIG. 2) on axles 21 extending between parallel side members 22, which project above the rollers to prevent the cut lengths from falling sideways off the rollers. The assembly thus formed is supported in cantilever fashion by arms 23 which are themselves supported for guided movement on wheels 25 mounted on rails 26 for movement at right angles to the length of the stillage between an advanced position in which the side members 22 are disposed over the respective lines of stillage posts 10 and a withdrawn position. This movement is actuated by a hydraulic or pneumatic actuator 27 connected between the arms 23 and the frame 29 of a carriage 28 which carries the rails 26 for the roller assemblies.

Carriage 28 comprises a chassis 30 mounted on wheels 31 and carrying all the assemblies of rollers 19. The stillage is supported on flanged rollers 32 which are mounted on axles fixed to the ground so that each stillage can be rolled into position, and the carriage is traversible towards and away from one side of the stillage by hydraulic or pneumatic actuators 34 connected between the carriage and a fixed point.

At points intermediate the assemblies of rollers 19, vertical screwed rods 35 are rotatably mounted at the front edge of the carriage 28 and an overhead electric motor 36 drives a train of shafts 37 to which are connected the input gears of reduction gearboxes 38, and the output gears of these gearboxes are secured to the upper ends of the respective screwed rods. A nut 39 engaged on each screwed rod has connected to it a carrier 40 for three grooved pulleys 41, of which the uppermost and lowermost engage the screwed rod at its forward side and of which the middle pulley engages the screwed rod at its rearward side so that the carrier is suitably braced to support a forwardly projecting tine 43 mounted on the carrier. The tines are thus disposed at intervals along the length of the carriage, and they project across the full width of the stillage. In the illustrated construction the upper surface of each tine is inclined forwardly at a small angle.

Also secured to the frame 29 are a number of devices 45 for dispensing the spacers 13 to lie across the full width of the extruded lengths. In the illustrated construction each device is designed to support a roll of corrugated cardboard and to measure, cut and drop a length of the cardboard across the extruded lengths, the width of the cardboard being slightly greater than the internal width of the stillage. In an alternative form the device dispenses spacers in the form of pre-cut pieces of corrugated cardboard from a stack of pre-cut pieces of a width slightly greater than the internal width of the stillage.

At the time the leading ends of the extruded lengths are fed across the rollers 19 and come up against the stop 20, the sets of rollers 19 and the extrusions which they carry are disposed at a higher level than the tines 43 of the fork (shown in solid lines in FIG. 3) and below the spacer dispensing device 45. The electric motor 36 is then started to cause the load fork tines 43 to be raised. The tines lift the extrusions 12 from the rollers 19 as indicated in chain lines in FIG. 3. The upward movement of the tines is stopped by a limit switch 48 which is attached to the frame 29 and which is actuated by a projection 49 on carrier 40. Actuation of the limit switch stops motor 36. The dispensing devices 45 are then operated to deposit lengths of corrugated cardboard on the extrusions. Also the actuators 27 are operated to withdraw the assemblies of rollers 19 from beneath the load fork tines. Motor 36 is then operated to drive the screwed rods 35 to lower the tines and extrusions into the stillage as shown in dotted lines in FIG. 2. The carriage is then withdrawn by the actuators and the stillage posts slide the extruded lengths off the tines as the tines move back with the carriage. The upper surface of the tine may be coated with a suitable low-friction material to avoid scratching the surface of the extrusions. The spacers 13 remain on top of the extruded lengths. The fork tines are then raised by the screwed rods and the carriage is run forward again by operation of the actuators to bring the roller 19 into their positions shown in full lines in FIG. 2. The apparatus is now set to receive the next layer of extrusions. When the stillage is full it can be rolled away on the flanged rollers 32 and a fresh stillage moved into place.

Figure 4:
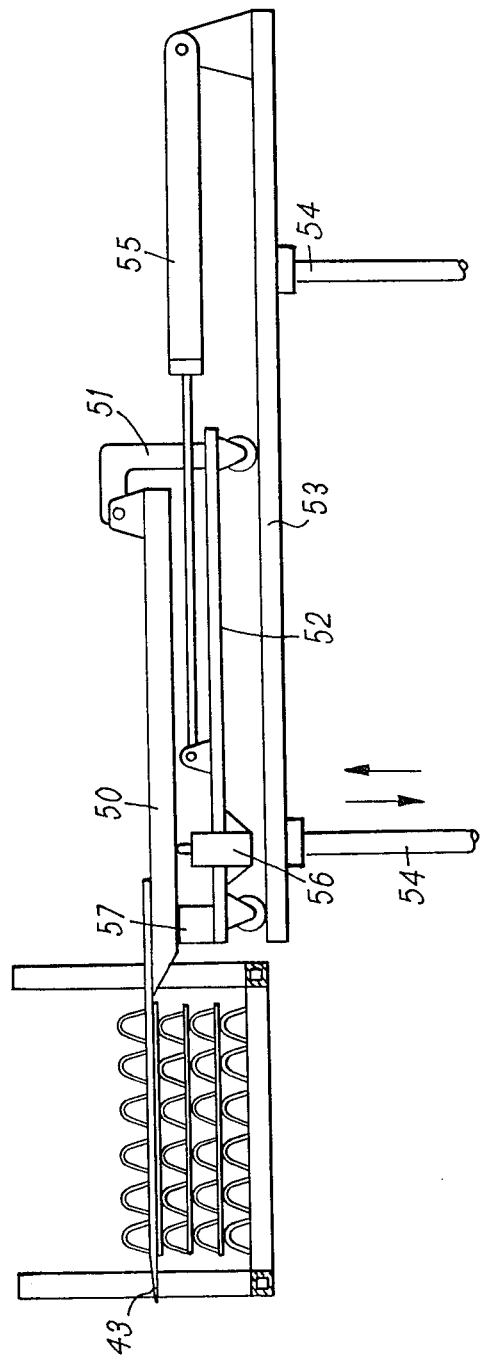
FIG. 4 illustrates an automatic fork withdrawal mechanism.

In a modification illustrated in FIG. 4 each tine 43 instead of effectively being fixedly attached to the jack arrangement constituted by nut 39 and screwed rods 35 is secured to the forward free end of a lever 50 which is pivotally mounted by its other end on an arm 51 secured to a trolley 52. The trolley is mounted for guided movement towards and away from the stillage on rails or the like carried by a platform 53 which is mounted on synchronised vertical jacks 54, and a hydraulic actuator 55 connected between anchorages on the trolley 52 and platform 53 operates to move the trolley. The lever 50 rests on a pressure switch 56, and a stop 57 on the trolley prevents the application of excessive pressure to the switch. The weight of the tine is sufficient to keep the movable element of the switch 56 depressed, but when the tine with its load of extrusions comes into engagement with the top layer of extrusions already in the stillage, the tine is lifted with respect to the trolley and releases the movable element of the switch, which is arranged to cause the actuator 55 to withdraw the trolley and tine, leaving the fresh layer of extrusions and the spacer 13 in the stillage. The tines are thus withdrawn individually.

It will be apparent that the described apparatus, since it is mounted at one side of the stillage permits free access to the extruded sections in the stillage by the operator, and since the apparatus is traversible laterally away from the stillage, the stillage can if desired be removed by a crane.

FIGS. 5 and 6 respectively show the general arrangement of the apparatus in side elevation and plan respectively. In the form shown in FIG. 5 the rollers 32 are mounted on a beam 60 which is supported by jacks 61 disposed in a pit beneath the stillage, and a catch 62 holds the stillage against movement lengthwise of itself on the rollers. The carriage in this instance carries six tines.

I claim:

1. Apparatus for loading a stillage, comprising a main frame, a plurality of forwardly projecting sub-frames which are mounted horizontally in line with each other on the main frame for forward and rearward movement relative to the main frame and which are spaced apart, one or more horizontal rollers carried by each sub-frame and mounted for rotation about respective horizontal axes extending at right angles to the direction in which the sub-frames are spaced apart, a plurality of forwardly projecting tines interspersed with the sub-frames in said direction so as to be capable of being moved vertically to levels above and below the sub-frames, the tines being mounted for vertical movement in unison relative to the frame to levels above and below the sub-frames and being movable forwardly and rearwardly.

2. Apparatus as claimed in claim 1, wherein the frame is fixed against forward and rearward movement and comprising means for moving the tines forward and rearward relative to the frame.

3. Apparatus as claimed in claim 1, wherein the tines are fixed against forward and rearward movement relative to the frame and are moved forward and rearward by moving the frame forward and rearward.

4. Apparatus as claimed in claim 1, wherein the tines are mounted for limited pivotal movement relative to the means whereby the tines are moved vertically between said levels and wherein sensing means is provided which is adapted to actuate movement of the tines rearward when the tines are moved upward through a predetermined distance in said limited vertical movement.

5. Apparatus as claimed in claim 4, further comprising, for each tine, a carriage mounted on the frame for said limited vertical movement and carrying a horizontal pivot on which the tine is mounted, said carriage being movable forward and rearward relative to the frame by an actuator, and said sensing means being mounted on the carriage and having an operating element which is arranged to move with the tine during said limited pivotal vertical movement thereof and to initiate operation of the actuator to move the tine rearward when the tine is moved upward through said predetermined distance.

6. Apparatus as claimed in claim 1, further comprising a device for depositing one or more spacer sheets on to an article or articles supported by the tines.

7. Apparatus as claimed in claim 6, wherein the device comprises a spindle for carrying a continuous web of spacer sheet material and means for cutting a length of the material from the web and depositing it on the article or articles.

8. Apparatus as claimed in claim 1 further comprising a plurality of wheels or rollers disposed forwardly of the frame and adapted to enable a stillage to be rolled thereon in said direction into a position underneath the tines and sub-frames.

9. Apparatus as claimed in claim 8, wherein the height of said wheels or rollers is adjustable.

10. Apparatus as claimed in claim 9, comprising jacks carrying two parallel rails on which the wheels or rollers are mounted in spaced relation to each other whereby the height of the rails and the wheels or rollers is adjustable.

* * * * *